May 21, 1968   H. M. WILES   3,384,056
TEMPERATURE CONTROL SYSTEMS FOR INTERNAL COMBUSTION ENGINES
Filed Aug. 1, 1966
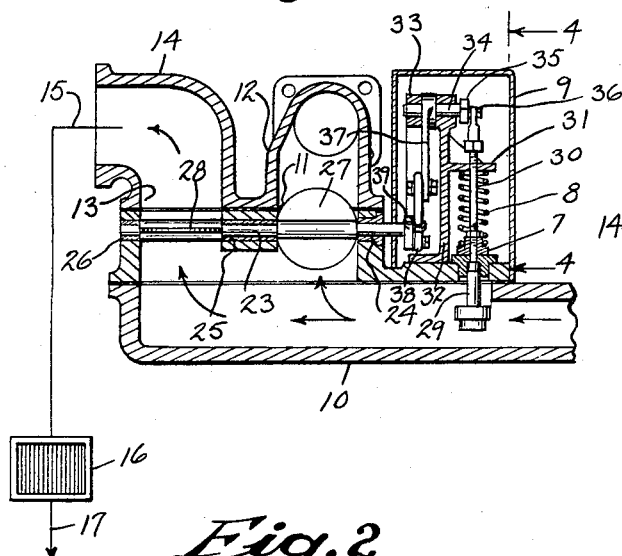
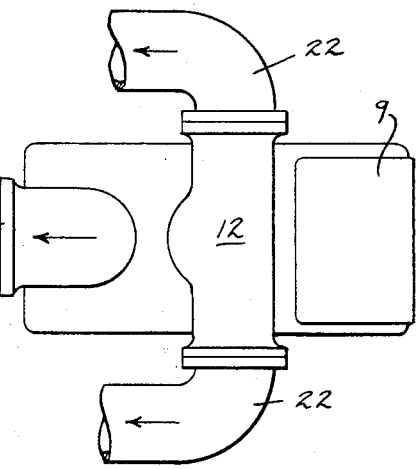
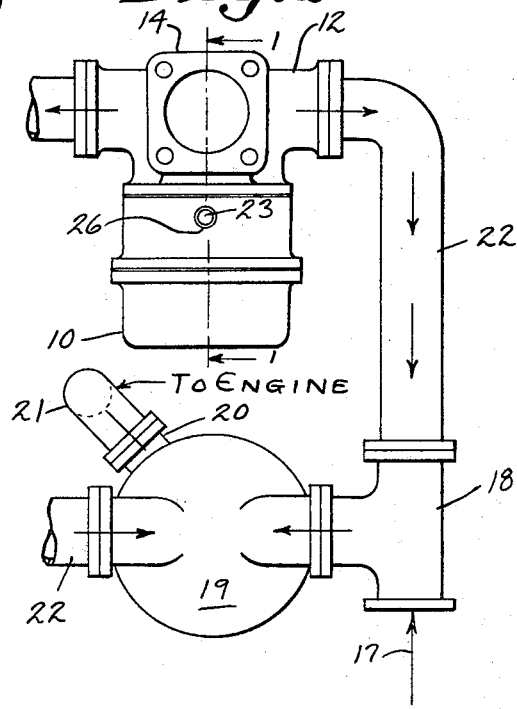
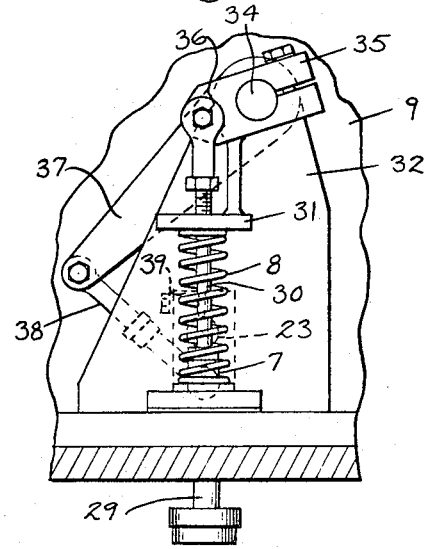
INVENTOR
Howard M. Wiles
BY
Morsell & Morsell
ATTORNEYS

United States Patent Office 3,384,056
Patented May 21, 1968

3,384,056
TEMPERATURE CONTROL SYSTEMS FOR INTERNAL COMBUSTION ENGINES
Howard M. Wiles, Waukesha, Wis., assignor to Waukesha Motor Company, Waukesha, Wis., a corporation of Wisconsin
Filed Aug. 1, 1966, Ser. No. 569,238
1 Claim. (Cl. 123—41.1)

ABSTRACT OF THE DISCLOSURE

A temperature control system for a liquid cooled internal combustion engine having a heat exchanger bypass conduit connecting a portion of the engine coolant manifold with the suction side of the coolant pump. Two valves, one controlling coolant flow to the heat exchanger and the other controlling coolant flow to the bypass conduit, are reversely mounted on a single shaft. The shaft is actuated by a temperature sensing element in response to the temperature of the manifold coolant so that there is always full flow of coolant to the pump during engine warmup.

---

This invention relates to improvements in temperature control systems for internal combustion engines.

In engines as conventionally manufactured the cooling water in that portion of the water manifold which leads from the cylinder head to the thermostat housing is adapted to act on a slidable thermostatic element or other bimetal element. When the engine is cold the thermostat keeps the main flow shut off and only allows very limited flow through a rather restricted slot in the thermostat housing for bypass back to the suction side of the water pump. This so throttles the flow of water through the pump during a warmup period that there is insufficient water flow in the cylinder head during warmup. However, in many uses it is required that the engine be on full load in a relatively short time, such as ten seconds or less, whereas with the control provided in a conventional cooling system full flow may not be attained for three to seven minutes. Insufficient cooling during such a period can lead to internal stress in the cylinder head which might result in a cracking of metal or other damage.

It has also been proposed heretofore to have a duct leading from the water manifold to a large thermostat housing containing a plurality of thermostats with a valve for each thermostat, depending upon the capacity required. However, with this type of an arrangement, the calcium and other minerals in the water eventually tend to obstruct the operation of one or more thermostats, and particularly the operation of a sliding thermostat, so that the plural thermostats must be checked and replaced at rather frequent intervals.

It is a general object of the present invention to provide an improved arrangement wherein there is always full, constant velocity flow through the water pump and engine cylinder block, even during warmup, and where the thermostat nevertheless efficiently controls the amount of water which is allowed to pass through the radiator or other heat exchanger depending upon the particular requirements.

A further object of the invention is to provide a temperature control system wherein the possibility of calcium or other minerals in the water interfering with operation of the thermostat is minimized by having the relatively slidable portions of the thermostat contained in a housing where they are out of contact with the cooling water and are arranged to operate a rock shaft on which the flow controlling valve elements are mounted, the rock shaft being self-cleaning by rotation as distinguished from a sliding action, and only the heat sensing portion being exposed to the coolant.

A further object of the invention is to provide a temperature control system as above described wherein only a single thermostatic element is required regardless of the water capacity.

A further object of the invention is to provide an improved temperature control system wherein there are dual butterfly valves, one controlling the bypass and one controlling the outlet flow to the radiator, said butterfly valves being mounted on a common rock shaft and being operated by a single thermostatic element.

With the above and other objects in view, the invention consists of the improved temperature control systems for internal combustion engines, as set forth in the claims, and all equivalents thereof.

In the accompanying drawings, illustrating one complete embodiment of the preferred form of the invention, in which the same reference numerals designate the same parts in all of the views:

FIG. 1 is a fragmentary sectional view through a portion of the cooling system taken on the line 1—1 of FIG. 2, part of the top water manifold and its connecting lines being broken away and the radiator being shown diagrammatically;

FIG. 2 is a fragmentary front elevational view, some of the conduits being broken away;

FIG. 3 is a top view of the mechanism shown in FIG. 1, parts of the water bypass conduits being broken away;

FIG. 4 is a sectional view taken on the line 4—4 of FIG. 1.

Referring more particularly to the drawings, the numeral 10 designates the top water manifold of an internal combustion engine, there being a bypass opening 11 in an upper portion which connects with a top bypass fitting 12. Another top opening 13 connects with an L-shaped fitting 14 which is connected by a line 15 with the inlet to the radiator 16 or other heat exchanger. The outlet 17 from the radiator connects with a T-fitting 18 mounted on the water pump 19 to admit cooling water from the radiator to the suction side of the pump 19. The outlet 20 of the water pump is connected by a conduit 21 with the inlet to the cylinder block of the internal combustion engine to deliver cooling water to the cylinder block water jacket.

The bypass fitting 12 may be connected by one or more lines 22 with the suction side of the water pump as shown in FIGS. 2 and 3. In the embodiment illustrated in the drawing, the bypass fitting 12 is a T-fitting and there are two bypass lines 22 both leading to the suction side of the pump 19, two such lines being employed in V-type engines. For an in-line type engine only one line 22 would be employed.

In the form of invention illustrated in FIG. 1, at the top of the top water manifold there is rotatably mounted rock shaft 23 journaled in bearing portions 24, 25 and 26 which are preferably lined with "Teflon" or other material, the shaft extending across both the bypass opening 11 and the outlet opening 13 in the top of the manifold. Mounted on the shaft 23, to be operated thereby, are butterfly valves 27 and 28. The butterfly valve 27 controls the bypass opening 11 and the butterfly valve 28 controls the outlet opening 13 leading to the radiator. It is to be noted from FIG. 1 that when the butterfly valve 27 is in the fully opened position shown, the butterfly valve 28 is in a closed position.

Suitably mounted in the top water manifold 10, to be subject to the temperature of the water therein, is a temperature sensing power element 29. This is preferably a Detroit Controls Company thermostat marketed under the trademark "Vernatherm." From FIGS. 1 and 3 it will be apparent that the thermostat has a slidably movable rod element 30 which is moved lineally in one direction or another in response to the temperature of the water acting on the sensing element 29. The upper portion of the rod 30 is slidable in an opening of a guide projection 31 projecting from a standard 32, there being a preload and return spring 8 between the guide 31 and an adjustable nut 7 on the rod. At the upper end of the standard is a bearing portion 33 within which a pivot shaft 34 is journaled, the outer end of said shaft rigidly carrying a lever 35. The upper end of the rod 30 is pivotally connected as at 36 to the lever 35. Rigidly connected to the rock shaft 34 is one end of a lever 37, the other end of the lever 37 being connected by a link 38 with the outer end of a lever 39 mounted rigidly on the valve shaft 23. Thus, when the temperature in the manifold 10, as sensed by the element 29, causes upward slidable movement of the rod 30, it will act through the lever 35 to cause rocking of the pivot shaft 34 and swinging movement of the lever 37. The latter will act through the link 38 and lever 39 to cause rocking of the valve shaft 23 in a direction which tends to move the butterfly valve 28 toward open position and the butterfly valve 27 toward closing position, as will be hereinafter explained in detail. Reverse movement of the rod 30 as a result of a cooling of the water in the manifold 10 will cause reverse opration of the butterfly valves 27 and 28.

OPERATION

In operation, at start-up, when the water in the system is cold, the thermostatic element 29 is unaffected, keeping the valve 27 wide open and the valve 28 completely closed. As the water warms up, the thermostatic sensing element 29 is acted upon to cause linear slidable movement of the rod 30 in an upward direction. This causes rocking of the valve shaft 23 in a direction to cause partial closing of the butterfly valve 27 and partial opening of the butterfly valve 28 to allow just enough water to flow to the radiator 16 as is necessary to maintain the temperature control point. When the water flowing through the manifold 10 is at maximum temperature the valve 27 may be completely closed and the valve 28 completely open. The ends of the rock shafts are so mounted with proper seals as to prevent loss of coolant. As a result of this arrangement, when the engine is cold the thermostat keeps the main flow to the radiator through the fitting 14 and line 15 shut off. As the water warms up, the improved arrangement always allows a full flow through the water pump and engine cylinder block, the thermostat properly controlling the percentage of water which is allowed to pass through the radiator 16 or other heat exchanger, depending upon the particular requirements. With conventional cooling systems there is only a limited flow allowed through a bypass to the pump when the engine is cold and during warmup. As a result there is insufficient water flow in the cylinder head during warmup, and in those cases where the engine is on full load in a relatively short time, such as ten seconds or less, with conventional cooling system controls, there may be a lag of several minutes before full flow is obtained through the water pump and cylinder block. This unsatisfactory cooling situation during the warmup period can lead to internal stresses in the cylinder head which may result in cracking of the metal or other damage. The present invention completely eliminates the above objectionable feature of conventional cooling systems and allows full flow to the cylinder head during warmup.

In addition, with the present invention the relatively slidable and other actuating parts connected to the thermostatic element 29 are contained in an external box or thermostat housing 9 out of contact with the cooling water. Thus there is no danger of calcium or other minerals in the water interfering with the action of the elements in the box 9. With conventional thermostat arrangements where the very restricted bypass slot is through the thermostat housing, the relatively slidable parts in the housing are subjected to the action of calcium and other minerals in the water. As a result, conventional thermostats must be checked and replaced at relatively frequent intervals.

It is also to be noted that a single thermostat suffices in the present novel arrangement regardless of the water capacity. This is to be distinguished from prior practices where a plurality of thermostats were frequently used when capacity requirements make this necessary. It is to be noted that the temperature sensing element 29 can have its upper end sealed against the wall of the manifold by use of a suitable gasket whereby there is a seal around the lineally movable valve rod portion. The present temperature controlling system has been very successfully used in diesel engines and is applicable for use in any internal combustion engine.

Various changes or modifications may be made without departing from the spirit of the invention, and all of such changes are contemplated as may come within the scope of the claim.

What I claim is:

1. In a liquid cooled internal combustion engine having a water manifold, having a coolant pump, having a heat exchanger through which the coolant is adapted to be circulated, and having two coolant conduits leading from said manifold, their being openings between said manifold and conduits, and one of said conduits being an outlet conduit leading to the heat exchanger and the other being a bypass conduit leading to the suction side of the pump, a rock shaft rotatably mounted to span said openings and having an end projecting externally of the manifold, a valve operably connected to said rock shaft and postioned to control flow through the opening to the outlet conduit, a reversely positioned valve on said rock shaft positioned to control flow through the opening to the bypass conduit, a temperature-sensing element in said manifold responsive to the temperature of the coolant therein, and movable motion-transmitting parts positioned externally of the manifold out of contact with the coolant and connected between said temperature-sensing element and the projecting end of the rock shaft for transmitting valve operating motion.

References Cited

UNITED STATES PATENTS

| 1,558,009 | 10/1925 | Giesler | 123—41.1 |
| 3,014,467 | 12/1961 | Middendorf et al. | 123—41.1 |
| 3,080,857 | 3/1963 | Middendorf | 123—41.1 |

AL LAWRENCE SMITH, *Primary Examiner.*